Aug. 12, 1930.  L. PONDAL  1,772,961

COOKING STOVE

Filed Dec. 31, 1927

L. Pondal
INVENTOR

By: Marks & Clerk
Attys.

Patented Aug. 12, 1930

1,772,961

UNITED STATES PATENT OFFICE

LUIS PONDAL, OF BUENOS AIRES, ARGENTINA

COOKING STOVE

Application filed December 31, 1927. Serial No. 243,952.

This invention has reference to an improved cooking vessel and has for its object an apparatus for cooking automatically and with an insignificant consumption of fuel. Other accessory objects of same are described later in this specification.

In this manner the maximum amount of heat is obtained at a minimum of cost. In fact, once the foodstuffs are brought to boiling point, the fire may be put out, and the cooking and seasoning left to finish, by means of the heat which is contained in the foodstuffs and retained by the insulated walls of the vessel.

One of the advantages derived from this system is that it is not necessary to pay any attention to the food-stuffs whilst cooking, either by skimming or stirring.

Another important point secured by this apparatus is the maintenance of the temperature of the food for a long period.

Moreover, it is not necessary, as in ordinary vessels, first to put in the food stuffs which are difficult to cook, and after a time those which are easily cooked, but all may be put in at the same time, together with condiments; whatever time they may be left in the apparatus, they will be found to be perfectly seasoned, and cooked to perfection.

Another object of the invention is to make it possible to cook various dishes at the same time, which is achieved by employing a cooking vessel with vertical divisions.

Another point is that of being able to keep the food hot in the cooking utensil itself, and carrying the latter. For this purpose the pot is provided with insulated sides, and with insulated top and bottom as well. The two last-named are only put into place after the pot has been withdrawn from the stove.

In order that the invention may be clearly understood, and easily put into practice, it has been illustrated by way of example in one of the forms in which it may be carried into practice, in the accompanying drawings.

Figure 1:
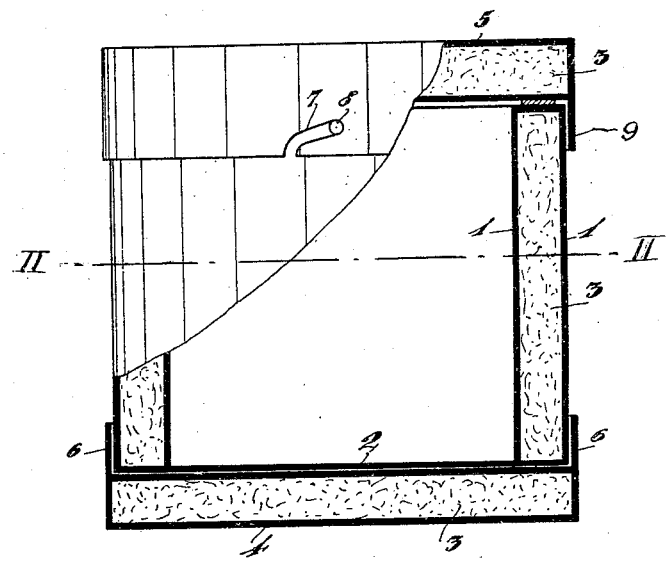
Figure 2:
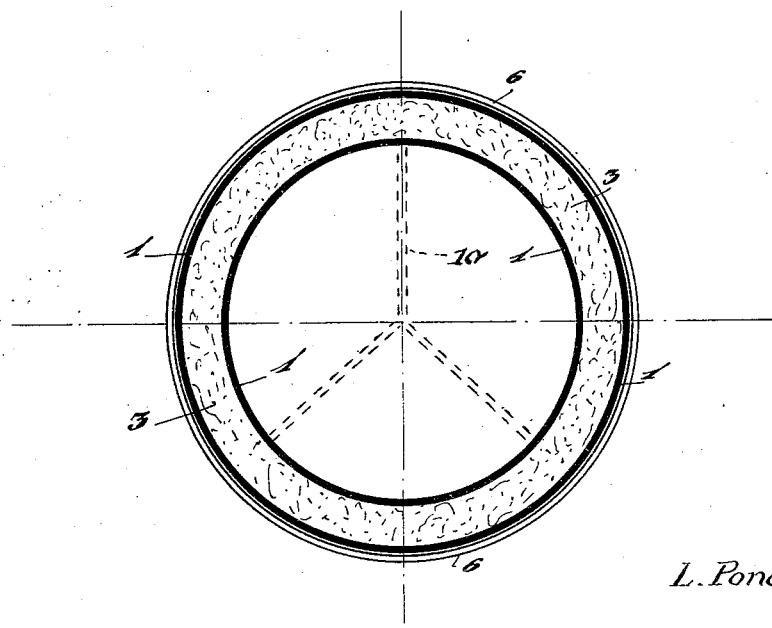

Figure 1 is an elevation partially in partial section of an insulated cooking pot for use with a stove, and is the object of this invention, and further for carrying same and keeping the contents hot, and Figure 2 is a horizontal section along line II—II of Figure 1.

In the figures, the same reference numbers indicate the same or corresponding parts.

Following is a description of the vessel described in Figures 1 and 2.

The heat which is given out by the stove, together with that contained in the food and retained by the insulated walls of the apparatus, is sufficient to keep the contents of the cooking pot hot for many hours, and to finish off the cooking and seasoning in a far more advantageous manner, both from an economical and culinary point of view, than with the ordinary type of stove.

It is necessary to provide a separate water heater, with its own source of heat, whether electricity or alcohol.

This simple utensil is suitable for cooking one sole dish, or it may be divided so as to provide for several dishes. In this latter case it is simply a matter of a pot with vertical divisions 10, as may be seen in the dotted lines in Figure 2. If it is required to use the pot to carry the food away from the stove, the insulated pot illustrated in Figs. 1 and 2 is suitable. This pot consists of three parts: the recipient 1, with a single bottom but double walls filled in with asbestos 3, a double bottom 4 provided with a flange 6 so that the pot shall fit perfectly into it, and a top 5 also with double walls is provided with a flange 9 fitting closely on to the pot. Both the top and the bottom cones are insulated with asbestos 3 and are interchangeable.

The interchangeability not only simplifies and cheapens the manufacture but also makes the pot or vessel reversible.

Furthermore, the top has on either side a fastening slot 7 which engages a pin 8 in the side of the pot, with the object of uniting the parts perfectly, and in the case of the top cover bringing pressure upon the washer 11, of india rubber or other suitable material.

The working of this pot is as follows: To secure the proper cooking of the contents, it is placed in a stove, without top or bottom. Once the food is brought to the boil, the pot is withdrawn and the top 5 and bottom 4 placed in position.

In this manner the contents go on cooking and seasoning, and remain hot for a long time.

In the construction of this apparatus thin plates of aluminium, iron or other suitable metal, are used for the double walls of both covers and pots, and the filling is of asbestos or other material refractory to high temperatures, and non-conductor of heat.

The form of the pot or vessel instead of being cylindrical may, as can easily be understood, be of square or any other form.

It is evident that the invention is not limited to the embodiments described and illustrated, but may undergo modifications as to details, always provided that these do not depart from the sphere of the invention, which is clearly determined in the claims.

Claims:

1. A cooking vessel comprising a main body portion having double side walls, said side walls being spaced and having insulating material therebetween, and detachable top and bottom covers for said vessel, each of said covers being double walled and containing heat insulating material, said top and bottom covers being interchangeable.

2. A cooking vessel as claimed in claim 1, said body and said covers having cooperating means for locking said cover to said body, said means comprising annular flanges on said covers adapted to embrace the respective ends of the body.

3. A cooking vessel as claimed in claim 1, said body and said covers having cooperating means for locking said covers to said body, said means comprising flanges on said covers adapted to embrace the repective ends of said body; said body having radially projecting studs and said covers each having inclined slots to cooperate with said studs to hold said cover firmly on said body.

In testimony whereof I affix my signature.

LUIS PONDAL.